US011898359B2

(12) United States Patent
Yoshida et al.

(10) Patent No.: US 11,898,359 B2
(45) Date of Patent: Feb. 13, 2024

(54) BINDING MACHINE

(71) Applicant: MAX CO., LTD., Tokyo (JP)

(72) Inventors: Yusuke Yoshida, Tokyo (JP); Shigeki Shindou, Tokyo (JP); Kenichi Arai, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/721,132

(22) Filed: Apr. 14, 2022

(65) Prior Publication Data

US 2022/0333392 A1 Oct. 20, 2022

(30) Foreign Application Priority Data

Apr. 16, 2021 (JP) ................................ 2021-069932

(51) Int. Cl.
*E04G 21/12* (2006.01)
*B21F 7/00* (2006.01)
*B25B 25/00* (2006.01)

(52) U.S. Cl.
CPC .............. *E04G 21/123* (2013.01); *B21F 7/00* (2013.01); *B25B 25/00* (2013.01)

(58) Field of Classification Search
CPC .. B21F 15/02; B21F 15/04; B21F 7/00; E04G 21/122; E04G 21/123; B65B 13/025; B65B 13/04; B65B 13/06; B65B 13/08; B65B 13/14
See application file for complete search history.

(56) References Cited

U.S. PATENT DOCUMENTS 10,857,587 B2 * 12/2020 Morijiri ................ E04G 21/123
2017/0218631 A1 * 8/2017 Matsuno ................ B21F 15/04
2018/0195299 A1 7/2018 Itagaki
2020/0290759 A1 9/2020 Yoshida et al.
2021/0189746 A1 6/2021 Itagaki

FOREIGN PATENT DOCUMENTS

JP H10-250708 A 9/1998
JP 2000-263461 A 9/2000
WO 2017-014270 A1 1/2017

OTHER PUBLICATIONS

Extended European Search Report dated Sep. 8, 2022, issued by the European Patent Office in the corresponding European Patent Application No. 22168458.2. (9 pages).

* cited by examiner

*Primary Examiner* — Debra M Sullivan
(74) *Attorney, Agent, or Firm* — Banner & Witcoff, Ltd.

(57) ABSTRACT

A binding machine includes: a wire feeder; a binding part configured to twist the wire wound around the object to be bound; a curl guide configured to curl the wire fed by the wire feeder; and an draw-in guide configured to guide the wire curled by the curl guide to the binding part, in which the draw-in guide includes a guiding facilitation part that comes into contact with the wire from a radially outer side of a loop that is formed by the wire curled by the curl guide, and applies, to the wire, a force that changes a feeding path of the wire, and a guiding concave portion, provided on a downstream side of the guiding facilitation part in a feeding direction of the wire, into which the wire, expanding toward the radially outer side of the loop, enters.

3 Claims, 6 Drawing Sheets

BINDING MACHINE

CROSS-REFERENCE TO RELATED APPLICATIONS

This application claims priority to Japanese Patent Application No. 2021-069932 filed on Apr. 16, 2021, the content of which is incorporated herein by reference.

TECHNICAL FIELD

The present disclosure relates to a binding machine for binding an object to be bound such as a reinforcing bar or the like with a wire.

BACKGROUND ART

A binding machine called a reinforcing bar binding machine has been proposed, which winds a wire around two or more reinforcing bars and twists the wire wound on the reinforcing bars to thus bind the two or more reinforcing bars with the wire.

The binding machine sends the wire fed by the driving force of a motor through a guide called a curl guide or the like to curl the wire and wind around the reinforcing bar. The curled wire is guided to a binding part that twists the wire, by a guide called an draw-in guide, and the like, and the wire wound around the reinforcing bar is twisted by the binding part, so that the reinforcing bar is bound with the wire.

The guide that guides the curled wire to the binding part has a shape in which a distance between a pair of wall surfaces gradually narrows from a leading end side where the wire is advanced toward the rear end side (see, for example, International Publication No. WO2017/014270). As a result, when entering the guide that guides the curled wire to the binding part, the wire is guided along the pair of wall surfaces between which the distance is gradually narrowed.

When the entry angle of the wire entering the guide that guides the wire to the binding part is increased, the angle at which the wire comes into contact with the wall surface is increased when the leading end of the wire comes into contact with one of the pair of wall surfaces. When the contact angle of the wire with respect to the wall surface is increased, the resistance due to friction of the wire sliding along the wall surface is increased, and the wire cannot be fed.

SUMMARY OF INVENTION

The present disclosure has been made in order to solve such a problem, and it is an object of the present disclosure to provide a binding machine capable of reliably feeding a wire regardless of the entry angle of the wire.

According to an embodiment of the present disclosure, there is provided a binding machine including: a wire feeder configured to feed a wire to be wound around an object to be bound; a binding part configured to twist the wire wound around the object to be bound; a curl guide configured to curl the wire fed by the wire feeder; and an draw-in guide configured to guide the wire curled by the curl guide to the binding part, in which the draw-in guide includes a guiding facilitation part that comes into contact with the wire from a radially outer side of a loop that is formed by the wire curled by the curl guide, and applies, to the wire, a force that changes a feeding path of the wire, and a guiding concave portion, provided on a downstream side of the guiding facilitation part in a feeding direction of the wire, into which the wire, expanding toward the radially outer side of the loop, enters.

According to the embodiment of the present disclosure, the wire guided into the draw-in guide expands in the direction in which the diameter of the loop is gradually increased and enters the guiding concave portion, thus coming into contact with the guiding facilitation part on the upstream side of the guiding concave portion in the feeding direction of the wire.

When the wire guided by the draw-in guide comes into contact with the guiding facilitation part, a force that changes the feeding path of the wire acts on the wire. As a result, the wire can be guided to the binding part regardless of the entry angle of the wire entering the draw-in guide.

DESCRIPTION OF EMBODIMENTS

Hereinafter, an example of a reinforcing bar binding machine as an embodiment of the binding machine according to the present disclosure will be described with reference to the drawings.

<Configuration Example of Reinforcing Bar Binding Machine According to Exemplary Embodiment>

Figure 1A:
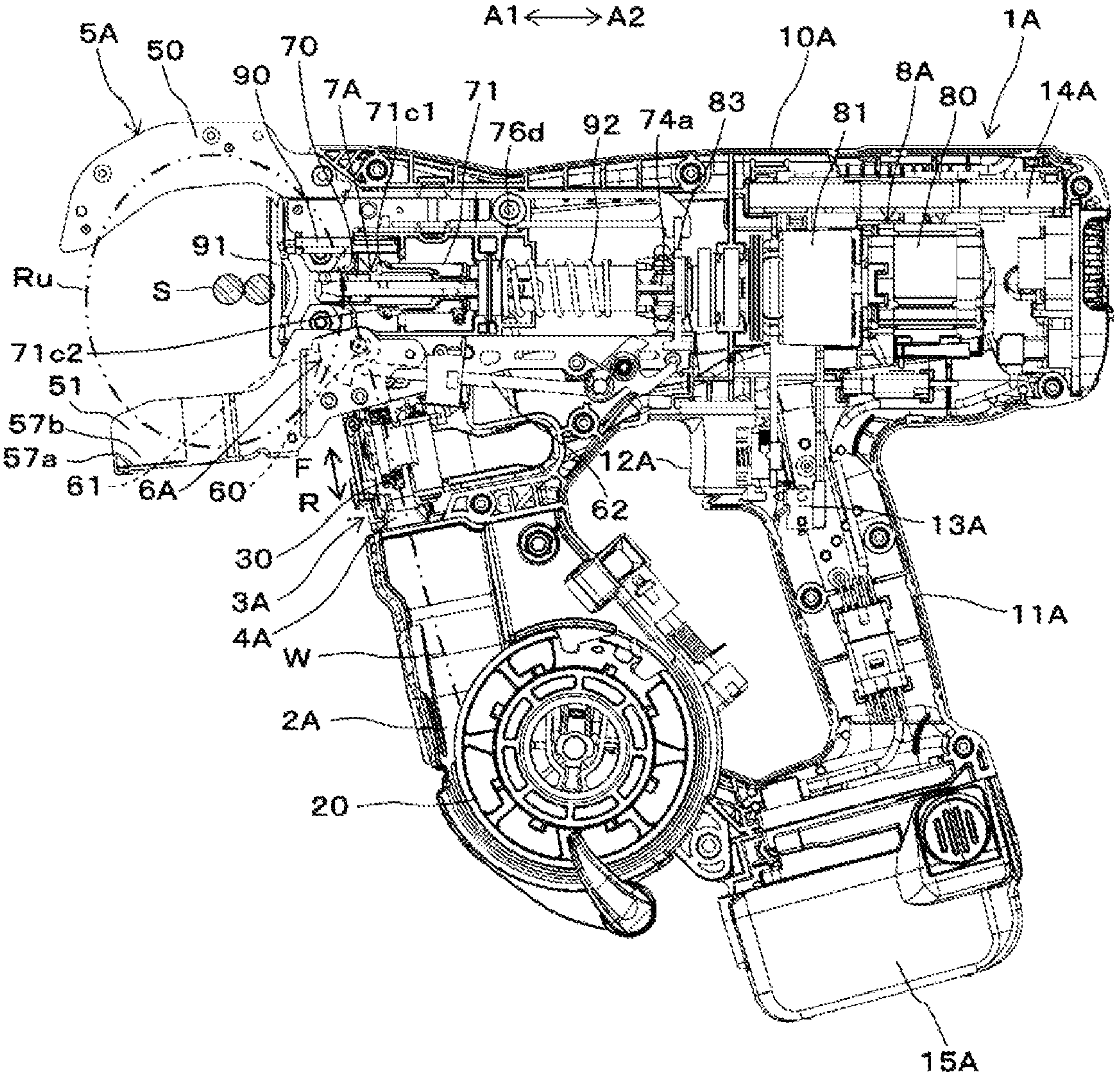
FIG. 1A is an internal configuration diagram, seen from other side, illustrating an example of an overall configuration of a reinforcing bar binding machine according to an embodiment.
Figure 1B:
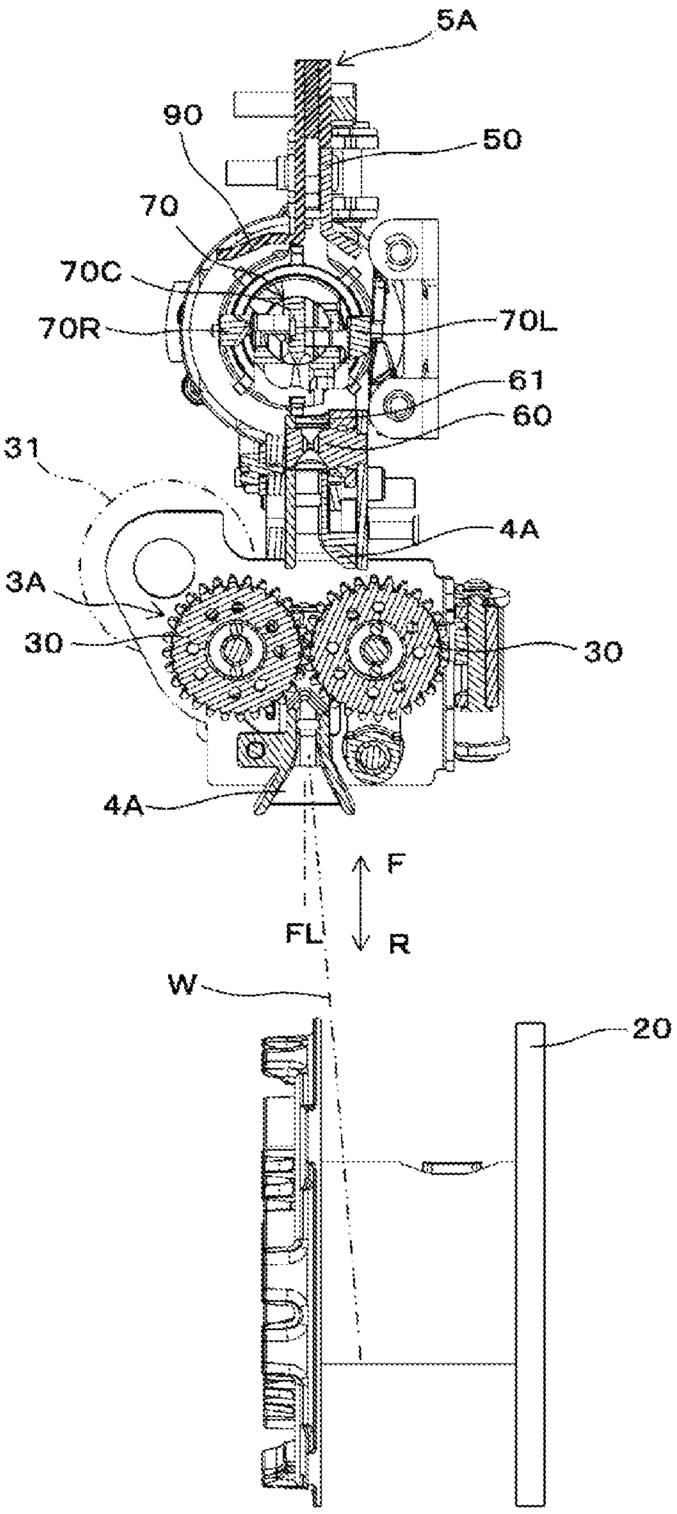
FIG. 1B is a front sectional view illustrating an example of the overall configuration of the reinforcing bar binding machine according to the embodiment.

FIG. 1A is an internal configuration diagram, seen from other side, illustrating an example of an overall configuration of a reinforcing bar binding machine according to an embodiment, and FIG. 1B is a front sectional view illustrating an example of the overall configuration of the reinforcing bar binding machine according to the embodiment.

A reinforcing bar binding machine 1A has such a form that the operator holds it in his/her hand to use, and includes a main body 10A and a handle 11A. Further, the reinforcing bar binding machine 1A feeds a wire W in a positive direction as indicated by an arrow F to loop the wire W around reinforcing bars S that are the object to be bound, feeds the wire W looped around the reinforcing bars S in the reverse direction as indicated by an arrow R to wind the wire W on the reinforcing bars S and cuts the wire W, and then twists the wire W and binds the reinforcing bars S with the wire W.

In order to achieve the functions mentioned above, the reinforcing bar binding machine 1A includes a magazine 2A that houses the wire W, a wire feeder 3A that feeds the wire W, and a wire guide 4A that guides the wire W to be fed to the wire feeder 3A. Further, the reinforcing bar binding machine 1A includes a curl forming part 5A forming a path for looping the wire W fed by the wire feeder 3A around the reinforcing bars S, and a cutter 6A that cuts the wire W wound on the reinforcing bars S. Further, the reinforcing bar binding machine 1A includes a binding part 7A that twists the wire W wound on the reinforcing bars S, and a driving part 8A that drives the binding part 7A.

The magazine 2A is an example of a housing in which a reel 20 with a long wire W releasably wound thereon is rotatably and detachably housed. For the wire W, a wire made of a plastically deformable metal wire, a wire which is a metal wire coated with resin, or a stranded wire is used. One or a plurality of wires W are wound on a hub portion (not illustrated) of the reel 20, such that one, or simultaneously a plurality of wires W can be pulled out from the reel 20.

As illustrated in FIG. 1B, the reel 20 is attached to the magazine 2A in a state of being offset in one direction with respect to the feeding path FL of the wire W defined by the wire guide 4A to be described below.

The wire feeder 3A includes a pair of feed gears 30 that hold one or a plurality of wires W in parallel therebetween to feed the wires, and a feed motor 31 that drives the feed gears 30. In the wire feeder 3A, the rotational movement of the feed motor 31 is transmitted via a transmission mechanism (not illustrated) to rotate the feed gears 30.

As a result, the wire feeder 3A feeds the wire W held between the pair of feed gears 30 along an extending direction of the wire W. In a configuration in which a plurality of wires W such as, for example, two wires W are fed, the two wires W are fed in parallel.

In the wire feeder 3A, by switching between forward and reverse rotation directions of the feed motor 31, the rotation direction of the feed gear 30 can be switched, and the feeding direction of the wire W is switched between the positive direction which is one direction, and the reverse direction which is the other direction opposite to the one direction.

The wire guide 4A is provided at a predetermined position on the upstream side and the downstream side of the wire feeder 3A with respect to the feeding direction in which the wire W is fed in the positive direction. In a configuration in which two wires W are fed, the wire guide 4A restricts an orientation of the two wires W in a radial direction, arranges the two incoming wires Win parallel, and guides the wires between the pair of feed gears 30.

The wire guide 4A has a shape such that an opening on the downstream side with respect to the feeding direction of the wire W fed in the positive direction restricts the orientation of the wire W in the radial direction. On the other hand, an opening on the upstream side with respect to the feeding direction of the wire W fed in the positive direction has a larger opening area than the opening on the downstream side.

The curl forming part 5A includes a curl guide 50 that forms a winding curl with the wire W fed by the wire feeder 3A, and an draw-in guide 51 that guides the wire W formed with the winding curl by the curl guide 50 to the binding part 7A. In the reinforcing bar binding machine 1A, the path of the wire W fed by the wire feeder 3A is restricted by the curl forming part 5A, so that the locus of the wire W forms a loop Ru as illustrated by a two-dot chain line in FIG. 1A, and the wire W is looped around the reinforcing bars S.

Figure 2A:
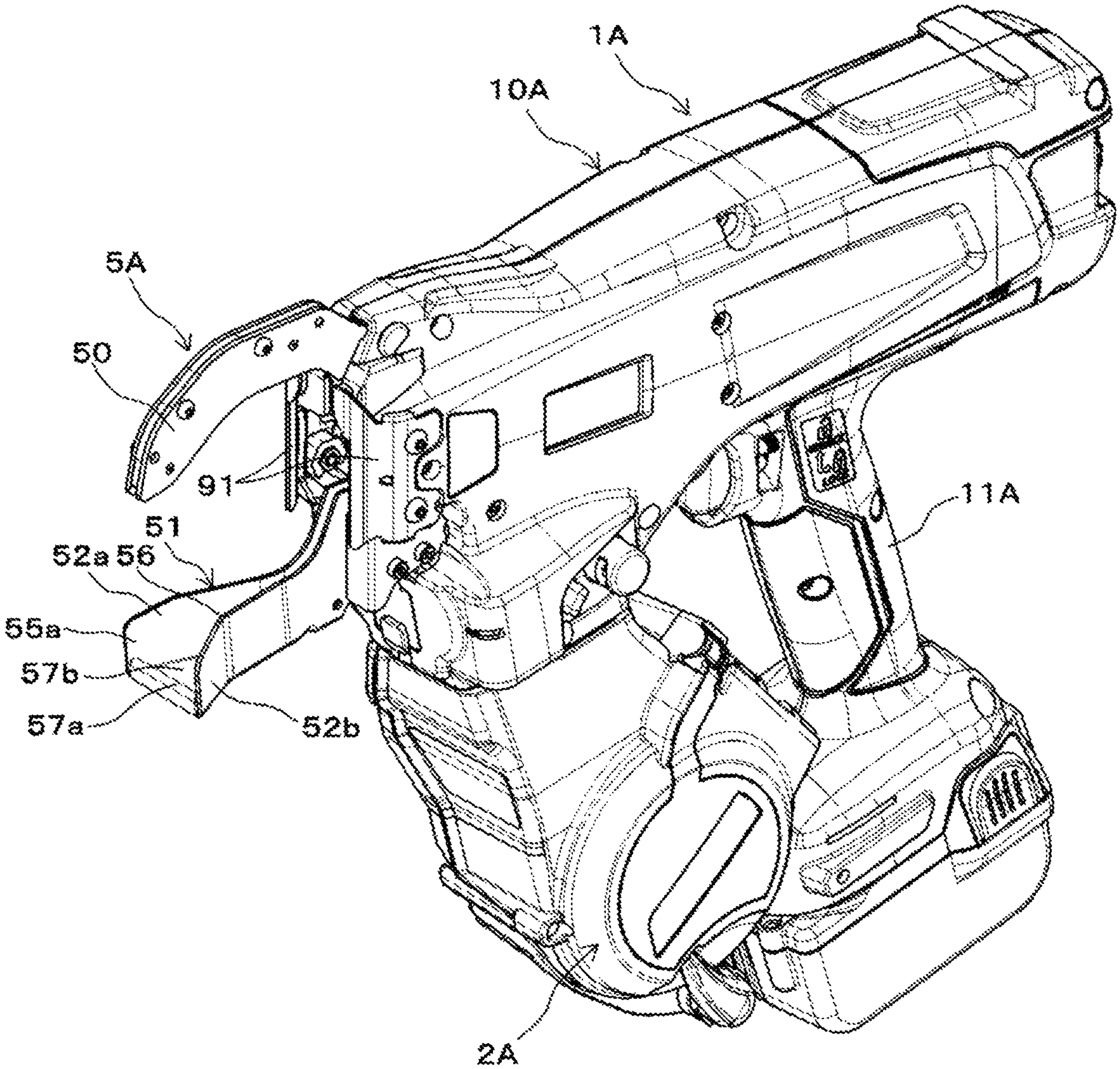
FIG. 2A is an overall perspective view illustrating an example of an draw-in guide according to the embodiment.
Figure 2B:
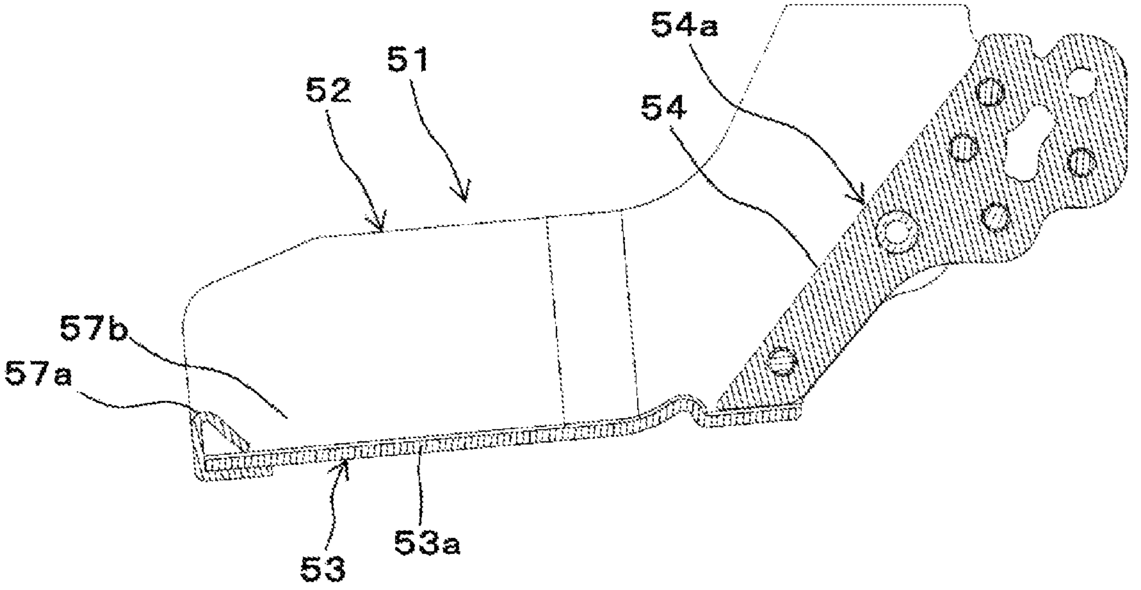
FIG. 2B is a cross-sectional view illustrating a main part of the example of the draw-in guide according to the embodiment.
Figure 2C:
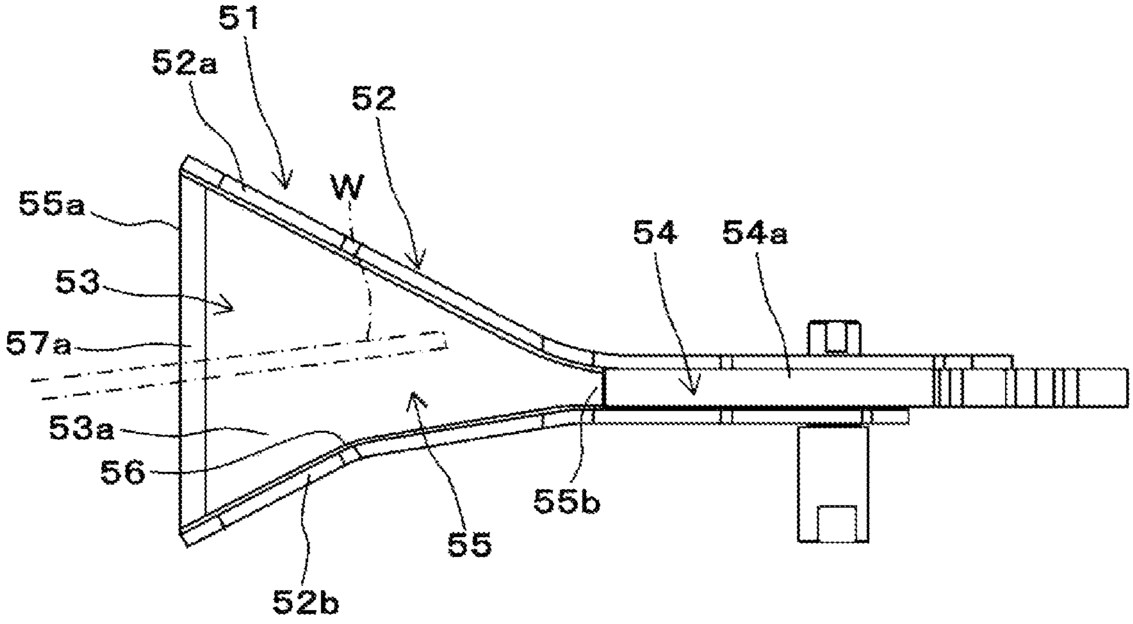
FIG. 2C is a plan view illustrating a main part of the example of the draw-in guide according to the embodiment.

FIG. 2A is an overall perspective view illustrating an example of the draw-in guide according to the embodiment, FIG. 2B is a cross-sectional view illustrating a main part of the example of the draw-in guide according to the embodiment, FIG. 2C is a plan view illustrating a main part of the example of the draw-in guide according to the embodiment, and the draw-in guide 51 of the embodiment will be described below. The draw-in guide 51 is provided at a position offset in the other direction, which is the opposite direction to the one direction in which the reel 20 is offset with respect to the feeding path FL of the wire W defined by the wire guide 4A.

The draw-in guide 51 includes a first guide 52 that restricts an axial position of the loop Ru formed by the wire W curled by the curl guide 50, and a second guide 53 and a third guide 54 that restrict a radial position of the loop Ru formed by the wire W.

The first guide 52 and the second guide 53 are, relative to the third guide 54, provided on a side where the wire W curled by the curl guide 50 is introduced.

The first guide 52 includes a side surface portion 52*b* on one side that is a side positioned in the one direction where the reel 20 is offset. Further, the first guide 52 includes, on the other side that is a side positioned in the opposite direction to the one direction where the reel 20 is offset, a side surface portion 52*a* facing the side surface portion 52*b*.

The second guide 53 includes a bottom surface portion 53*a* connecting the side surface portion 52*a* and the side surface portion 52*b*, in which the side surface portion 52*b* is erected on one side and the side surface portion 52*a* is erected on the other side.

The third guide 54 includes, on a radially outer side of the loop Ru formed by the wire W, a guide surface 54*a* which is a surface extending toward the binding part 7A along the feeding direction of the wire W.

In the draw-in guide 51, a converging path 55 is formed in a space surrounded by a pair of side surface portions 52*a* and 52*b* and the bottom surface portion 53*a*. Further, in the draw-in guide 51, an open end 55*a*, through which the wire W enters the converging path 55, is formed. The open end 55*a* is opened in the space surrounded by the pair of side surface portions 52*a* and 52*b* and the bottom surface portion 53*a*.

In the first guide 52, a distance between the side surface portion 52*a* and the side surface portion 52*b* is widest at the open end 55*a*, and gradually narrows from the open end 55*a* toward the guide surface 54*a* of the third guide 54, and a narrowest portion 55*b* is formed.

The draw-in guide 51 includes an entry angle restriction part 56 that changes the entry angle of the wire W entering the converging path 55 to direct the wire W toward the narrowest portion 55*b*.

In the reinforcing bar binding machine 1A, the reel 20 is disposed in the state of being offset in the one direction. The wire W, which is fed from the reel 20 offset in the one direction by the wire feeder 3A and curled by the curl guide 50, is directed toward the other direction, which is the opposite direction to the one direction in which the reel 20 is offset.

Therefore, the wire W entering the converging path 55 between the side surface portion 52*a* and the side surface portion 52*b* of the first guide 52 first enters toward the side surface portion 52*a*. The leading end of the wire W entering toward the side surface portion 52*a* is directed toward the narrowest portion 55*b* of the converging path 55. Therefore, the entry angle restriction part 56 is provided on the side surface portion 52*b* facing the side surface portion 52*a*.

The entry angle restriction part 56 is configured such that a portion of the side surface portion 52*b* at an approximately intermediate position in the entry direction of the wire W is in a projected shape in the direction of the side surface portion 52*b*.

The draw-in guide 51 includes a guiding facilitation part 57*a* that comes into contact with the wire W from the radially outer side of the loop Ru that is formed by the wire W curled by the curl guide 50, and applies, to the wire W, a force that changes the feeding path of the wire W. Further, the draw-in guide 51 includes an guiding concave portion 57*b* into which the wire W, expanding toward the radially outer side of the loop Ru, enters between the guiding facilitation part 57*a* and the third guide 54.

The guiding facilitation part 57*a* is configured by providing a convex portion protruding in the curl guide 50 direction on the bottom surface portion 53*a* of the second guide 53 formed of a flat surface. The guiding facilitation part 57*a* is provided on the open end 55*a* side from the center of the bottom surface portion 53*a* along the feeding direction of the wire W, and in this example, is provided along the open end 55*a* over the entire width thereof.

The guiding facilitation part 57*a* is configured by integrating a convex member having a predetermined shape such as a triangular cross-sectional shape or the like with the bottom surface portion 53*a*, or by attaching a component separate from the bottom surface portion 53*a* to the bottom surface portion 53*a*. Further, the guiding facilitation part 57*a* may be formed of a rotating member such as a roller or the like which has a shaft extending along the open end 55*a* and which the wire W is able to contact with. The guiding facilitation part 57*a* is at a protruding height from the bottom surface portion 53*a* so as to avoid a contact with the leading end of the wire W that is curled by the curl guide 50 and guided by the draw-in guide 51.

The guiding concave portion 57*b* is provided on the downstream side of the guiding facilitation part 57*a* with respect to the feed direction of the wire W fed in the positive direction, and is formed of the bottom surface portion 53*a* of the second guide 53 that is concave toward the radially outer side of the loop Ru formed by the wire W with respect to the guiding facilitation part 57*a*.

The wire W curled by the curl guide 50 is introduced between the pair of side surface portions 52*a* and 52*b* of the first guide 52. The draw-in guide 51 is widen in a direction in which the diameter of the loop Ru formed by the wire W is increased, so that the wire W comes into contact with the guiding facilitation part 57*a* of the second guide 53 and the entry direction of the wire W can be changed. As a result, the wire W introduced between the pair of side surface portions 52*a* and 52*b* of the first guide 52 is guided to the third guide 54.

The cutter 6A includes a fixed blade 60, a movable blade 61 that cuts the wire W in cooperation with the fixed blade 60, and a transmission mechanism 62 that transmits a movement of the binding part 7A to the movable blade 61. The cutter 6A cuts the wire W by the rotational movement of the movable blade 61 around the fixed blade 60 as a fulcrum axis.

The binding part 7A includes the wire locking body 70 to which the wire W is locked, and a rotating shaft 72 for operating the wire locking body 70. The driving part 8A includes a motor 80 and a speed reducer 81 that decreases speed and amplifies torque. In the binding part 7A and the driver 8A, the rotating shaft 72 and the motor 80 are connected via the speed reducer 81, and the rotating shaft 72 is driven by the motor 80 via the speed reducer 81.

In the reinforcing bar binding machine 1A, the curl guide 50 and the draw-in guide 51 of the curl forming part 5A described above are provided at a front end of the main body 10A, which is one side of the rotating shaft 72 along the axial direction. Further, the reinforcing bar binding machine 1A includes a feed restriction part 90 to be contacted with a leading end of the wire W, on the feeding path of the wire W that is guided by the curl forming part 5A and locked by the wire locking body 70. Further, in the reinforcing bar binding machine 1A, a contacting portion 91 to be contacted with the reinforcing bars S is provided at a front end of the main body 10A between the curl guide 50 and the draw-in guide 51.

In the reinforcing bar binding machine 1A, the handle 11A extends downward from the main body 10A. Further, a battery 15A is detachably attached to a lower portion of the handle 11A. Further, in the reinforcing bar binding machine 1A, the magazine 2A is provided in front of the handle 11A. In the reinforcing bar binding machine 1A, the wire feeder 3A, the cutter 6A, the binding part 7A, the driving part 8A for driving the binding part 7A, and the like described above are housed in the main body 10A.

In the reinforcing bar binding machine 1A, a trigger 12A is provided on a front side of the handle 11A, and a switch 13A is provided inside the handle 11A. In the reinforcing bar binding machine 1A, a control unit 14A controls the motor 80 and the feed motor 31 according to the state of the switch 13A pressed by the operation of the trigger 12A.

Figure 3A:
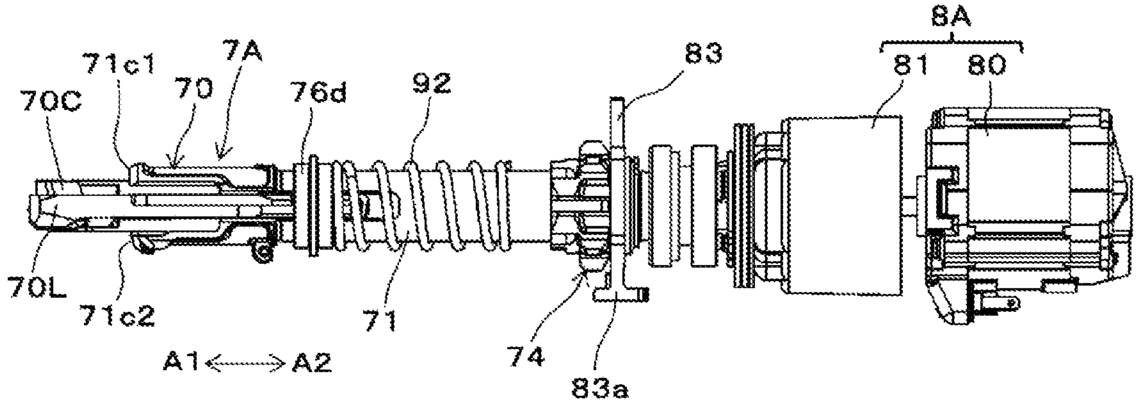
FIG. 3A is a side view illustrating a configuration of a main part of the reinforcing bar binding machine according to the embodiment.
Figure 3B:
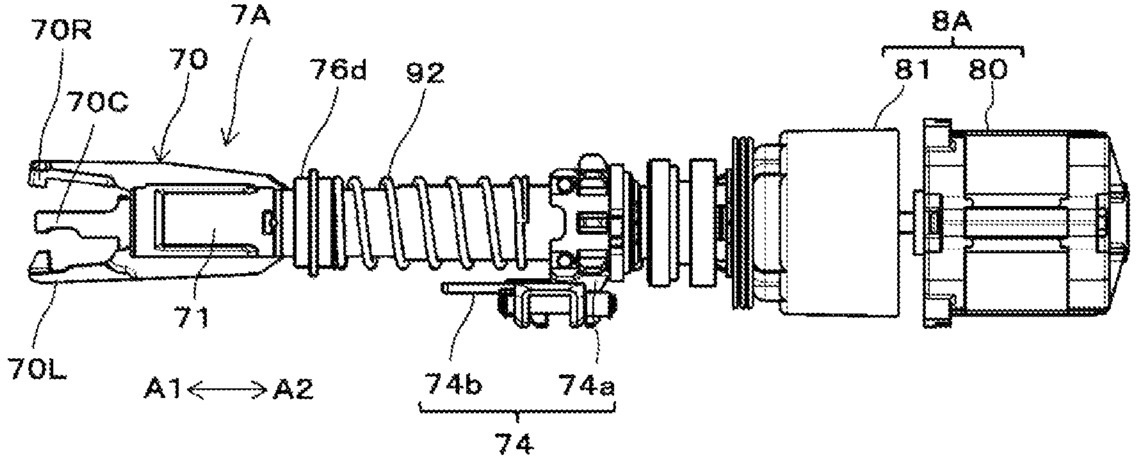
FIG. 3B is a top view illustrating the configuration of the main part of the reinforcing bar binding machine according to the embodiment.
Figure 3C:
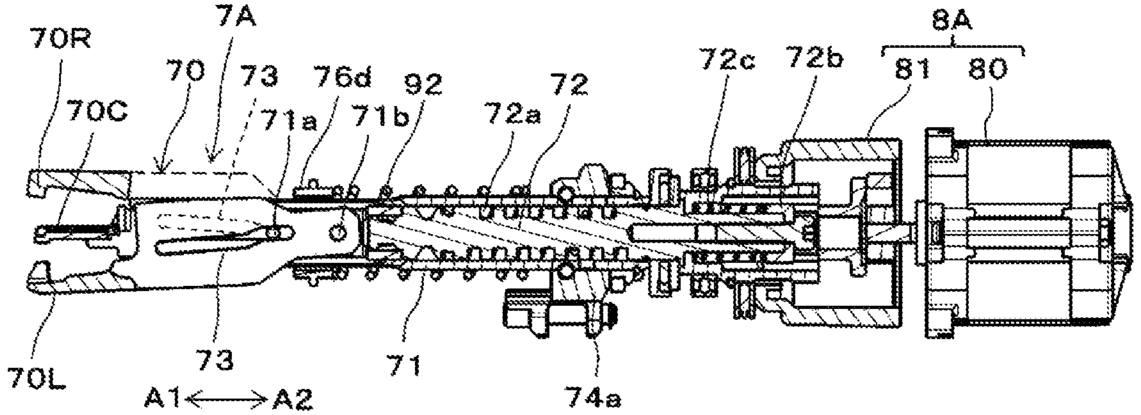
FIG. 3C is a top sectional view illustrating the configuration of the main part of the reinforcing bar binding machine according to the embodiment.

FIG. 3A is a side view illustrating the configuration of the main part of the reinforcing bar binding machine according to the embodiment, FIG. 3B is a top view illustrating the configuration of the main part of the reinforcing bar binding machine according to the embodiment, and FIG. 3C is a top sectional view illustrating the configuration of the main part of the reinforcing bar binding machine according to the embodiment. Then, the details of the binding part 7A and the connecting structure of the binding part 7A and the driver 8A will be described with reference to each drawing.

The binding part 7A includes the wire locking body 70 to which the wire W is locked, and a rotating shaft 72 for operating the wire locking body 70. In the binding part 7A and the driving part 8A, the rotating shaft 72 and the motor 80 are connected via the speed reducer 81, and the rotating shaft 72 is driven by the motor 80 via the speed reducer 81.

The wire locking body 70 includes a center hook 70C connected to the rotating shaft 72, a first side hook 70L and a second side hook 70R that are opened and closed with respect to the center hook 70C, and a sleeve 71 that operates the first side hook 70L and the second side hook 70R in conjunction with the rotational movement of the rotating shaft 72.

The binding part 7A may be divided into a front side where the center hook 70C, the first side hook 70L, and the second side hook 70R are provided, and a rear side where the rotating shaft 72 is connected to the speed reducer 81.

The center hook 70C is connected to the front end, which is one end of the rotating shaft 72, via a configuration that enables rotation with respect to the rotating shaft 72 and also enables movement in the axial direction integrally with the rotating shaft 72.

The leading end side of the first side hook 70L, which is one end along the axial direction of the rotating shaft 72, is positioned on one side with respect to the center hook 70C. Further, the rear end side of the first side hook 70L, which is the other end along the axial direction of the rotating shaft 72, is rotatably supported by the center hook 70C by a shaft 71*b*.

The leading end side of the second side hook 70R, which is one end along the axial direction of the rotating shaft 72, is positioned on the other side with respect to the center hook 70C. Further, the rear end side of the second side hook 70R, which is the other end along the axial direction of the rotating shaft 72, is rotatably supported by the center hook 70C by the shaft 71*b*.

As a result, the wire locking body 70 is opened and closed in a direction in which the leading end side of the first side hook 70L separates away from and approaches the center hook 70C by the rotational movement about the shaft 71*b* as the fulcrum. Further, the leading end side of the second side hook 70R is opened and closed in a direction in which the leading end side separates away from and approaches the center hook 70C.

The rotating shaft 72 is connected to the speed reducer 81 at a rear end, which is the other end, via a connecting part 72*b* having a configuration that is integrally rotatable with the speed reducer 81 and is also movable in the axial direction with respect to the speed reducer 81. The connecting part 72*b* includes a spring 72*c* that biases the rotating shaft 72 rearward, which is a direction of approaching the speed reducer 81, and restricts the position of the rotating shaft 72 along the axial direction. As a result, the rotating shaft 72 is configured such that, by the force pushing rearward applied by the spring 72*c*, the rotating shaft 72 is movable forward, that is, movable in a direction of separating away from the speed reducer 81. Therefore, upon application of the force that moves the wire locking body 70 forward along the axial direction, the rotating shaft 72 is movable forward by the force pushing rearward applied by the spring 72*c*.

The sleeve 71 is shaped such that a range of a predetermined length from the end at the forward direction indicated by an arrow A1 along the axial direction of the rotating shaft 72 is divided into two parts in the radial direction, receiving therein the first side hook 70L and the second side hook 70R in openable and closable manner. Further, the sleeve 71 has a cylindrical shape that covers the circumference of the rotating shaft 72, and includes a convex portion (not illustrated) protruding from an inner peripheral surface of a tubular space where the rotating shaft 72 is inserted, in which the convex portion enters a groove portion of a feed screw 72*a* formed along the axial direction on the outer periphery of the rotating shaft 72. When the rotating shaft 72 is rotated, the sleeve 71 is moved in the forward and rearward direction, which is a direction along the axial direction of the rotating shaft 72, according to the rotation direction of the rotating shaft 72 by the action of the convex portion (not illustrated) and the feed screw 72*a* of the rotating shaft 72. Further, the sleeve 71 is rotated integrally with the rotating shaft 72.

The sleeve 71 includes an opening and closing pin 71*a* for opening and closing the first side hook 70L and the second side hook 70R.

The opening and closing pin 71*a* is inserted into an opening and closing guide hole 73 provided in the first side hook 70L and the second side hook 70R. The opening and closing guide hole 73 extends along a moving direction of the sleeve 71, and has a shape that converts the linear movement of the opening and closing pin 71*a* that is moved in conjunction with the sleeve 71 into an opening and closing movement by the rotation of the first side hook 70L and the second side hook 70R about the shaft 71*b* as a fulcrum.

In the wire locking body 70, as the sleeve 71 is moved in the rearward direction as indicated by an arrow A2, by the locus of the opening and closing pin 71*a* and the shape of the opening and closing guide hole 73, the first side hook 70L and the second side hook 70R are moved in the direction of separating away from the center hook 70C by the rotational movement about the shaft 71*b* as a fulcrum.

As a result, the first side hook 70L and the second side hook 70R are opened with respect to the center hook 70C, and the feeding path for the wire W to pass through is formed between the first side hook 70L and the center hook 70C, and between the second side hook 70R and the center hook 70C.

When the first side hook 70L and the second side hook are opened with respect to the center hook 70C, the wire W fed by the wire feeder 3A is passed between the center hook 70C and the first side hook 70L. The wire W passed between the center hook 70C and the first side hook 70L is guided to the curl forming part 5A. Then, the wire W formed with the winding curl by the curl forming part 5A and guided to the binding part 7A is passed between the center hook 70C and the second side hook 70R.

In the wire locking body 70, as the sleeve 71 is moved in the forward direction as indicated by the arrow A1, by the locus of the opening and closing pin 71*a* and the shape of the opening and closing guide hole 73, the first side hook 70L and the second side hook 70R are moved in a direction of approaching the center hook 70C by the rotational movement about the shaft 71*b* as a fulcrum. As a result, the first side hook 70L and the second side hook 70R are closed with respect to the center hook 70C.

When the first side hook 70L is closed with respect to the center hook 70C, the wire W held between the first side hook 70L and the center hook 70C is locked in a movable form between the first side hook 70L and the center hook 70C. Further, when the second side hook 70R is closed with respect to the center hook 70C, the wire W held between the second side hook 70R and the center hook 70C is locked in such a form that the wire W does not come off from between the second side hook 70R and the center hook 70C.

The wire locking body 70 includes a bending part 71*c*1 that pushes the leading end side, which is one end of the wire W, in a predetermined direction and bends the wire W to form the wire W into a predetermined shape. The wire locking body 70 includes a bending part 71*c*2 that pushes an end side, which is the other end of the wire W cut by the cutter 6A, in a predetermined direction and bends the wire W to form the wire W into a predetermined shape.

The sleeve 71 has such a shape that the end at the forward direction as indicated by the arrow A1 is divided into two parts of the first side hook 70L and the second side hook 70R with the center hook 70C held therebetween, and includes the bending part 71*c*1 formed at the front end at a position on an upper side in the non-rotating region, and the bending part 71*c*2 formed at the front end at a position on a lower side.

After the wire W is cut by the cutter 6A, the sleeve 71 is moved in the forward direction as indicated by the arrow A1 so that the leading end side of the wire W locked by the center hook 70C and the second side hook 70R is pushed by the bending part 71*c*1 and bent toward the reinforcing bars S side. Further, the sleeve 71 is locked by the center hook 70C and the first side hook 70L, and the end side of the wire W cut by the cutter 6A is pushed by the bending part 71*c*2 and bent toward the reinforcing bars S side.

The binding part 7A includes a rotation restriction part 74 that restricts the rotation of the wire locking body 70 and the sleeve 71 that are rotated in conjunction with the rotational movement of the rotating shaft 72. The rotation restriction part 74 is provided with a rotation restriction blade 74*a* on the sleeve 71 and is provided with a rotation restriction claw 74*b* on the main body 10A.

The rotation restriction blade 74*a* is configured by providing a plurality of convex portions radially protruding from the outer periphery of the sleeve 71 at predetermined intervals in the circumferential direction of the sleeve 71. The rotation restriction blade 74*a* is fixed to the sleeve 71 and is moved and rotated integrally with the sleeve 71.

The rotation restriction part 74 locks the wire W with the wire locking body 70, winds the wire W on the reinforcing bars S, and then cuts the wire W with the cutter 6A, and further, the rotation restriction blade 74*a* is locked to the rotation restriction claw 74*b* in the operating range in which the wire W is bent and formed by the bending parts 71*c*1 and 71*c*2 of the sleeve 71. When the rotation restriction blade 74*a* is locked with the rotation restriction claw 74*b*, the rotation of the sleeve 71 in conjunction with the rotation of the rotating shaft 72 is restricted, and the sleeve 71 is moved in the forward and rearward direction by the rotational movement of the rotating shaft 72.

Further, in the operating range in which the wire W locked by the wire locking body 70 is twisted, the rotation restriction part 74 is released from being locked with the rotation restriction claw 74*b* of the rotation restriction blade 74*a*. When the rotation restriction blade 74*a* is released from being locked with the rotation restriction claw 74*b*, the sleeve 71 is rotated in conjunction with the rotation of the rotating shaft 72. In the wire locking body 70, the center hook 70C, the first side hook 70L, and the second side hook 70R that lock the wire W are rotated in conjunction with the rotation of the sleeve 71. In the operating range of the sleeve 71 and the wire locking body 70 along the axial direction of the rotating shaft 72, the operating range in which the wire W is locked by the wire locking body 70 is referred to as a first operating range. Further, the operating range for twisting the wire W locked by the wire locking body 70 in the first operating range is referred to as a second operating range.

The binding part 7A is provided such that a moving member 83 is movable in conjunction with the sleeve 71. The moving member 83 is rotatably attached to the sleeve 71, is not in conjunction with the rotation of the sleeve 71, and is moved in the forward and rearward direction in conjunction with the sleeve 71.

The moving member 83 includes an engagement part 83*a* that engages with the transmission mechanism 62. In the binding part 7A, when the moving member 83 is moved in the forward and rearward direction in conjunction with the sleeve 71, the transmission mechanism 62 transmits the movement of the moving member 83 to the movable blade 61 to rotate the movable blade 61. As a result, the movable blade 61 is rotated in a predetermined direction by the movement of the sleeve 71 moving in the forward direction, and the wire W is cut.

The binding part 7A includes a tension applying spring 92 so that binding can be performed while tension is applied on the wire W. The tension applying spring 92 is provided outside the sleeve 71, and biases the sleeve 71 and the wire locking body 70 in the direction of separating away from the contacting portion 91 along the axial direction of the rotating shaft 72. The tension applying spring 92 is formed of, for example, a coil spring that expands and contracts in the axial direction, and is fitted on the outer periphery of the sleeve 71 between the rotation restriction blade 74*a* and a support frame 76*d* that rotatably and axially slidably supports the sleeve 71.

The tension applying spring 92 is compressed between the support frame 76*d* and the rotation restriction blade 74*a* according to the position of the sleeve 71 along the axial direction of the rotating shaft 72, and biases the sleeve 71 rearward, which is the direction of separating away from the contacting portion 91 along the axial direction of the rotating shaft 72. As a result, the tension applying spring 92 biases the wire locking body 70 provided with the sleeve 71 in the direction of maintaining the tension applied to the wire W with the movement of feeding the wire W in the reverse direction and winding the wire W on the reinforcing bar S.

As a result, when the sleeve 71 is moved forward and compressed, the tension applying spring 92 applies tension to the wire W that is cut by the cutter 6A after wound on the reinforcing bar S with a larger force than the force applied in the direction in which the wire W wound on the reinforcing bars S loosens. Therefore, it is possible to bind the wire W after cutting while applying tension thereto.

Further, the wire locking body 70 is configured to be movable forward as the sleeve 71 is applied with the force pushing rearward by the tension applying spring 92 and also as the rotating shaft 72 is applied with the force pushing rearward by the spring 72*c*.

<Operation Example of Reinforcing Bar Binding Machine According to Embodiment>

The operation of binding the reinforcing bars S with the wire W by a reinforcing bar binding machine 1A according to an exemplary embodiment will be described below with reference to each drawing.

When the reinforcing bars S are inserted between the curl guide 50 and the draw-in guide 51 of the curl forming part 5A, and the trigger 12A is operated, the feed motor 31 is driven in the forward rotation direction, and the wire W is fed by the wire feeder 3A in the positive direction as indicated by the arrow F.

In the case of a configuration in which the reinforcing bars S are bound with a plurality of wires W, such as two wires W for example, the two wires W are fed in parallel along the axial direction of the loop Ru formed by these wires W by the wire guide 4A.

The wires W fed in the positive direction are passed between the center hook 70C and the first side hook 70L and are fed to the curl guide 50 of the curl forming part 5A. By passing through the curl guide 50, the wire W is formed with a winding curl that is looped around the reinforcing bars S.

Figure 4A:
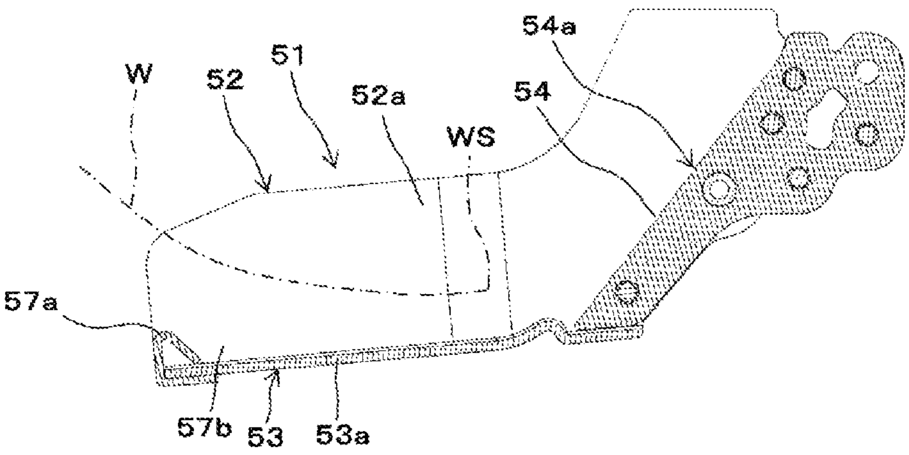
FIG. 4A is an explanatory diagram illustrating a movement of a wire in the draw-in guide.
Figure 4B:
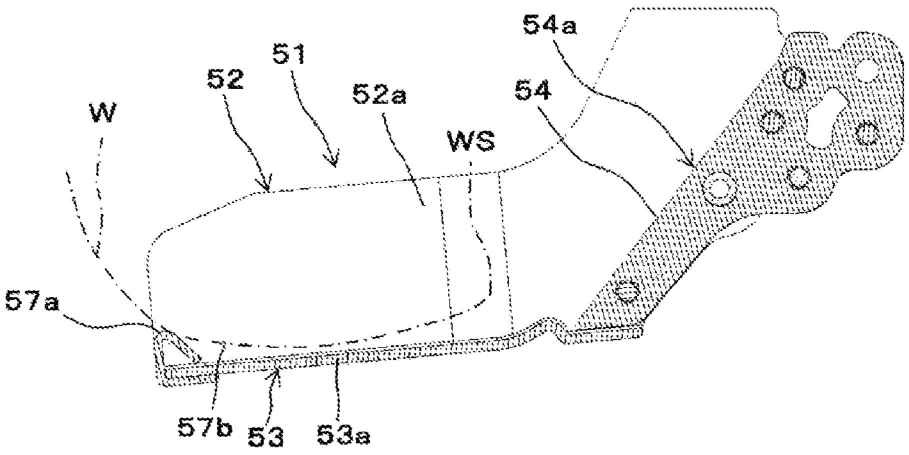
FIG. 4B is an explanatory diagram illustrating the movement of the wire in the draw-in guide.
Figure 4C:
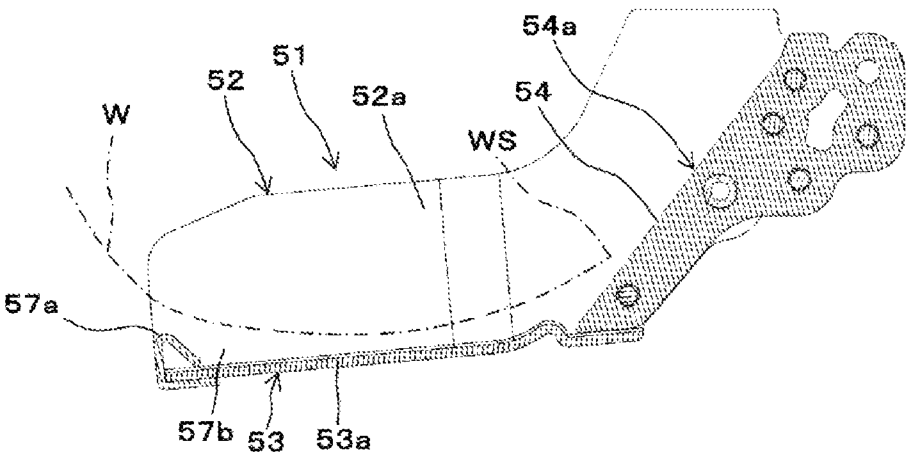
FIG. 4C is an explanatory diagram illustrating the movement of the wire in the draw-in guide.

The wire W curled by the curl guide 50 is guided into the draw-in guide 51. FIGS. 4A, 4B and 4C are explanatory diagrams illustrating the movement of the wire in the draw-in guide. The action and effect of inducing the wire W with the draw-in guide 51 will be described below.

As illustrated in FIG. 4A, the wire W curled by the curl guide 50 and guided into the draw-in guide 51 is passed through a path separate from the bottom surface portion 53*a* of the second guide 53 in the draw-in guide 51. Further, the wire W curled by the curl guide 50 is directed to the other direction, which is the opposite direction to the one direction in which the reel 20 is offset. Therefore, in the draw-in guide 51, the wire W entering between the side surface portion 52*a* and the side surface portion 52*b* of the first guide 52 first enters toward the side surface portion 52*a*.

In the draw-in guide 51, when a leading end WS of the wire W entering toward the side surface portion 52*a* comes into contact with the side surface portion 52*a*, the leading end WS of the wire W being guided along the side surface portion 52*a* is subjected to an increased resistance. When the amount of movement of the leading end WS of the wire W along the side surface portion 52*a* decreases due to the resistance caused by friction and the feed amount of the wire W fed in the positive direction is relatively increased, the diameter of the loop Ru formed by the wire W curled by the curl guide 50 is gradually increased.

As the diameter of the loop Ru is gradually increased by the feeding in the positive direction, the wire W guided into the draw-in guide 51 can follow a path to enter the guiding concave portion 57*b* to a position in contact with the bottom surface portion 53*a* of the second guide 53.

Therefore, as the wire W is guided into the draw-in guide 51 and the leading end WS comes into contact with the side surface portion 52*a*, as illustrated in FIG. 4B, the diameter of the loop Ru is gradually increased and the wire W enters the guiding concave portion 57*b*, thus coming into contact with the guiding facilitation part 57*a* on the upstream side of the guiding concave portion 57*b* with respect to the feeding direction of the wire W.

When the wire W guided by the draw-in guide 51 comes into contact with the guiding facilitation part 57*a*, a force that changes the feeding path of the wire W entering toward the side surface portion 52*a* acts on the wire W. As a result, by the further feeding in the positive direction, the wire W guided into the draw-in guide 51 can be guided so that the leading end WS is guided in the direction away from the side surface portion 52*a* and introduced into the narrowest portion 55*b* toward the third guide 54*b*, as illustrated in FIG. 4C.

Further, when the wire W is guided by the draw-in guide 51 so that the leading end WS comes into contact with the side surface portion 52*a*, the wire W is already applied with a force that changes the feeding path of the wire W entering toward the side surface portion 52*a*, by a contact with the entry angle restriction part 56, before coming into contact with the guiding facilitation part 57*a*. As a result, by the further feeding in the positive direction, the wire W guided into the draw-in guide 51 can be guided so that the leading end WS is guided in the direction away from the side surface portion 52*a* and introduced into the narrowest portion 55*b* toward the third guide 54*b*.

The wire W formed with the winding curl by the curl guide 50 is guided to the draw-in guide 51 and further fed by the wire feeder 3A in the positive direction, and guided between the center hook 70C and the second side hook 70R by the draw-in guide 51. Then, the wire W is fed until the leading end thereof is brought into contact with the feed restriction part 90. When the wire W is fed to a position where the leading end thereof is brought into contact with the feed restriction part 90, driving of the feed motor 31 is stopped.

After stopping feeding the wire W in the positive direction, the motor 80 is driven in the forward rotation direction. In the sleeve 71, in the first operating range in which the wire W is locked by the wire locking body 70, the rotation restriction blade 74*a* is locked to the rotation restriction claw 74*b*, so that the rotation of the sleeve 71 in conjunction with the rotation of the rotating shaft 72 is restricted. As a result, the rotation of the motor 80 is converted into linear movement, and the sleeve 71 is moved in the direction of the arrow A1 which is the forward direction.

When the sleeve 71 is moved in the forward direction, the opening and closing pin 71*a* is passed through the opening and closing guide hole 73. As a result, the first side hook 70L is moved in a direction of approaching the center hook 70C by the rotational movement about the shaft 71*b* as the fulcrum. When the first side hook 70L is closed with respect to the center hook 70C, the wire W held between the first side hook 70L and the center hook 70C is locked in a movable form between the first side hook 70L and the center hook 70C.

Further, the second side hook 70R is moved in the direction of approaching the center hook 70C by the rotational movement about the shaft 71*b* as a fulcrum. When the second side hook 70R is closed with respect to the center hook 70C, the wire W held between the second side hook 70R and the center hook 70C is locked in such a form that the wire W does not come off from between the second side hook 70R and the center hook 70C.

After advancing the sleeve 71 to the position where the wire W is locked by the movement of closing the first side hook 70L and the second side hook 70R, the rotation of the motor 80 is temporarily stopped, and the feed motor 31 is driven in the reverse rotation direction.

As a result, the pair of feed gears 30 are reversed, and the wire W held between the pair of feed gears 30 is fed in the opposite direction as indicated by the arrow R. Since the leading end side of the wire W is locked in a form so as not to come off between the second side hook 70R and the center hook 70C, the wire W is wound on the reinforcing bars S by the movement of feeding the wire W in the opposite direction.

After winding the wire W on the reinforcing bars S and stopping driving the feed motor 31 in the reverse rotation direction, by driving the motor 80 in the forward rotation direction, the sleeve 71 is further moved in the forward direction as indicated by the arrow A1.

The movement of the sleeve 71 in the forward direction is transmitted to the cutter 6A by the transmission mechanism 62, so that the movable blade 61 is rotated, and the wire W locked by the first side hook 70L and the center hook 70C is cut by the operation of the fixed blade 60 and the movable blade 61.

When the wire W is cut, the tension applied to the wire W is released so that the sleeve 71 tends to move in the forward direction. When the sleeve 71 is moved in the forward direction, the force for pulling the wire W locked by the wire locking body 70 rearward is decreased, and the wire W wound on the reinforcing bars S loosens before being twisted.

On the other hand, with the reinforcing bar binding machine 1A according to the present embodiment, in the operating range in which the sleeve 71 and the wire locking body 70 are moved in the forward direction to cut the wire W, the rotation restriction blade 74*a* comes into contact with the tension applying spring 92, and the tension applying spring 92 is compressed between the support frame 76*d* and the rotation restriction blade 74*a*, so that the sleeve 71 and the wire locking body 70 are biased rearward by the tension applying spring 92.

As a result, by suppressing the forward movement of the sleeve 71, the decrease in the force that pulls the wire W locked by the wire locking body 70 rearward is suppressed, thereby suppressing the loosening of the wire W wound on the reinforcing bars S before twisting.

By driving the motor 80 in the forward rotation direction, the sleeve 71 is moved in the forward direction as indicated by the arrow A1, and almost simultaneously with cutting the wire W, the bending part 71*c*1 is moved in the direction of approaching the reinforcing bars S. As a result, the leading end side of the wire W locked by the center hook 70C and the second side hook 70R is pressed toward the reinforcing bars S side by the bending part 71*c*1 and bent toward the reinforcing bars S side about the locking position as a fulcrum. By further moving the sleeve 71 forward, the wire W locked between the second side hook 70R and the center hook 70C is held in a state of being held by the bending part 71*c*1.

Further, the wire W is held between the first wire holding part 71*c*2*a* and the second wire holding part 71*c*2*b* forming the bending part 71*c*2 of the sleeve 71 and the come-off prevention part 70La of the first side hook 70L, and the end side of the wire W cut by the cutter 6A is further pressed toward the reinforcing bar S side by the bending part 71*c*2, and bent toward the reinforcing bar S side about the locking position as a fulcrum. By further moving the sleeve 71 forward, the wire W locked between the first side hook 70L and the center hook is held in a state of being held between the bending part 71*c*2.

After bending the leading end side and the end side of the wire W toward the reinforcing bars S side, the motor 80 is further driven in the forward rotation direction, so that the sleeve 71 is moved further forward. When the sleeve 71 is moved to a predetermined position and reaches the operating range where the wire W locked by the wire locking body 70 is twisted, the rotation restriction blade 74*a* is released from being locked with the rotation restriction claw 74*b*.

As a result, by further driving the motor 80 in the forward rotation direction, the sleeve 71 is rotated in conjunction with the rotating shaft 72, and the wire W locked by the wire locking body 70 is twisted.

In the binding part 7A, in the second operating range in which the sleeve 71 is rotated and twists the wire W, as the wire W locked by the wire locking body 70 is twisted, the wire locking body 70 is subjected to a force that pulls forward along the axial direction of the rotating shaft 72. Meanwhile, moving the sleeve 71 forward to a position where the sleeve 71 is rotatable causes the tension applying spring 92 to be further compressed, and the sleeve 71 receives the force pushing rearward applied by the tension applying spring 92.

As a result, when the force that moves the wire locking body 70 and the rotating shaft 72 forward along the axial direction is applied to the wire locking body 70, the sleeve 71 receives the force pushing rearward applied by the tension applying spring 92, and also, the rotating shaft 72 is moved forward while receiving the force pushing rearward applied by the spring 72*c*, and twists the wire W while being moved forward.

Therefore, as the portion of the wire W locked by the wire locking body 70 is pulled rearward and the tension is applied in the tangential direction of the reinforcing bars S, the wire W is pulled so as to be in close contact with the reinforcing bars S. In the binding part 7A, in a second operating range in which the sleeve 71 is rotated and twists the wire W, when the wire locking body 70 is further rotated in conjunction with the rotating shaft 72, the wire locking body 70 and the rotating shaft 72 are moved in the forward direction which is the direction of decreasing a gap between the twisted portion of the wire W and the reinforcing bars S, resulting in the wire W being further twisted.

Therefore, the wire W is twisted as the wire locking body 70 and the rotating shaft 72 are moved forward while receiving the force pushing rearward applied by the tension applying spring 92 and the spring 72*c*, so that the gap between the twisted portion of the wire W and the reinforcing bars S is decreased, and the wire W comes into close contact with the reinforcing bars S and in a form that conforms to the reinforcing bars S. As a result, the loosening of the wire W before twisting can be removed, and the wire W can be bound in a state of being in close contact with the reinforcing bars S.

When it is detected that the load applied to the motor 80 is maximized by twisting the wire W, the forward rotation of the motor 80 is stopped. Then, by driving the motor 80 in the reverse rotation direction, the rotating shaft 72 is rotated in the reverse direction, and the sleeve 71 is rotated in the reverse direction following the reverse rotation of the rotating shaft 72, such that the rotation restriction blade 74*a* is locked with the rotation restriction claw 74*b*, thus restricting the rotation of the sleeve 71 in conjunction with the rotation of the rotating shaft 72. As a result, the sleeve 71 is moved in the direction of the arrow A2 which is the rearward direction.

When the sleeve 71 is moved in the rearward direction, the bending parts 71*c*1 and 71*c*2 are separated from the wire W, and the wire W held by the bending parts 71*c*1 and 71*c*2 is released. Further, when the sleeve 71 is moved in the rearward direction, the opening and closing pin 71*a* is passed through the opening and closing guide hole 73. As a result, the first side hook 70L is moved in a direction of separating away from the center hook 70C by the rotational movement about the shaft 71*b* as a fulcrum. Further, the second side hook 70R is moved in a direction of separating away from the center hook 70C by the rotational movement about the shaft 71*b* as a fulcrum. As a result, the wire W comes off from the wire locking body 70.

What is claimed is:

1. A binding machine comprising:

a wire feeder including a pair of rotatable members that rotate while holding a wire therebetween to feed the wire, the wire being wound around an object to be bound;

a binding part including a clamp and a rotating shaft, the clamp locking the wire wound around the object to be bound, and the rotating shaft rotating the clamp locking the wire;

a curl guide arranged along a looped path of the wire fed by the wire feeder; and a draw-in guide configured to guide the wire curled by the curl guide to the binding part, wherein the draw-in guide includes a first guide being a pair of side surface portions that restrict an axial position of a loop formed by the wire curled by the curl guide, a second guide that restricts a radial position of the loop formed by the wire, the second guide being a bottom surface portion that connects the pair of side surface portions, a guiding facilitation part that comes into contact with the wire from a radially outer side of the loop that is formed by the wire curled by the curl guide, and applies, to the wire, a force that changes a feeding path of the wire, the guiding facilitation part being located on the bottom surface portion, and a guiding concave portion, provided on a downstream side of the guiding facilitation part in a feeding direction of the wire, into which the wire, expanding toward the radially outer side of the loop, enters, and wherein the guiding facilitation part includes a convex portion provided on an open end of the draw-in guide and protruding from the bottom surface portion in a direction toward the curl guide, the open end being opened in a space surrounded by the pair of side surface portions and the bottom surface portion and being configured to allow the wire to enter therethrough.

2. The binding machine according to claim 1, wherein the draw-in guide is provided with a converging path in which a distance between the pair of side surface portions is narrowed along an entry direction of the wire from an open end into which the wire fed by the wire feeder and curled by the curl guide enters, and the guiding facilitation part is provided closer to the open end than a center of the bottom surface portion along the feeding direction of the wire.

3. A binding machine comprising:

a wire feeder including a pair of rotatable members that rotate while holding a wire therebetween to feed the wire, the wire being wound around an object to be bound;

a binding part including a clamp and a rotating shaft, the clamp locking the wire wound around the object to be bound, and the rotating shaft rotating the clamp locking the wire;

a curl guide arranged along a looped path of the wire fed by the wire feeder; and a draw-in guide configured to guide the wire curled by the curl guide to the binding part, wherein the draw-in guide includes a guiding facilitation part that comes into contact with the wire from a radially outer side of the loop that is formed by the wire curled by the curl guide, and applies, to the wire, a force that changes a feeding path of the wire, a guiding concave portion, provided on a downstream side of the guiding facilitation part in a feeding direction of the wire, into which the wire, expanding toward the radially outer side of the loop, enters, and wherein the guiding facilitation part includes a rotating member which the wire is able to contact with.

* * * * *